United States Patent Office 3,234,108
Patented Feb. 8, 1966

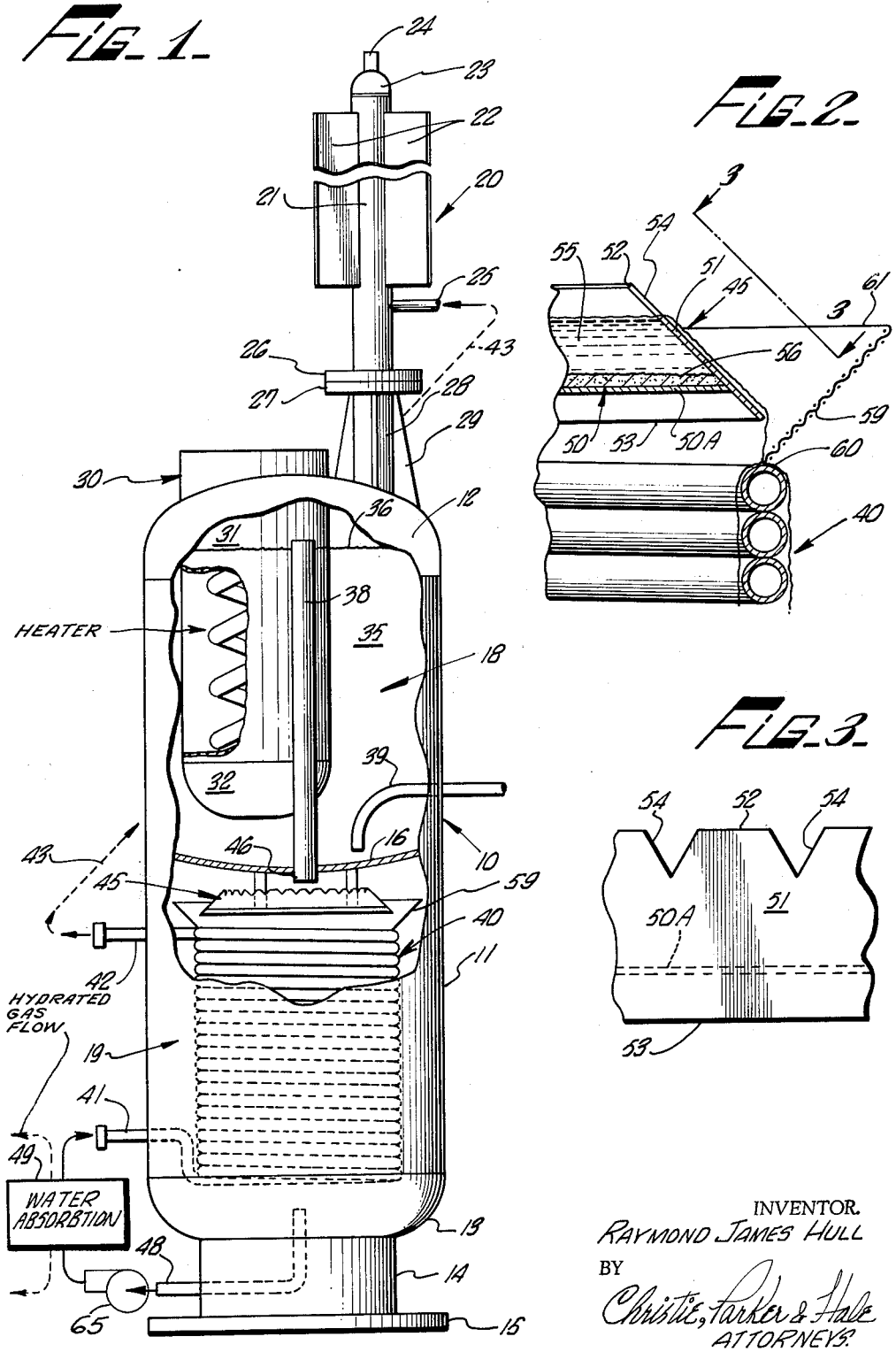

3,234,108
APPARATUS FOR REGENERATING A
CONTAMINATED SOLVENT
Raymond James Hull, Orange, Calif., assignor to Gas Processors, Inc., Brea, Calif., a corporation of California
Filed Jan. 2, 1962, Ser. No. 163,828
2 Claims. (Cl. 202—177)

This invention relates to a heat transfer apparatus for providing improved heat transfer between a liquid flowing exteriorly over a tubular heat exchange element and a fluid flowing interiorly of such element.

The heat transfer apparatus of the present invention is particularly useful in solvent regeneration apparatus utilized in various processes requiring absorption of contaminants from gaseous streams. In such processes, solvents selectively absorb contaminants upon contacting the gaseous stream and are then regenerated so as to separate the contaminant from the solvent and enable reuse of the purified solvent. Solvent absorption processes frequently invlove absorption of contaminants at a relatively low temperature and regeneration of the solvent at a relatively high temperature. It is therefore required that the contaminant-laden or "rich" solvent be heated for regeneration, and that the purified or "lean" solvent be cooled for absorption of contaminants. To minimize energy requirements for heating and cooling, the cyclic utilization of the solvent includes heat transfer between the relatively cool rich solvent and the relatively hot lean solvent. Attainment of maximum heat transfer with a minimum of heat transfer area is sought. This objective becomes increasingly difficult to achieve where viscous solvents are utilized, particularly in processes where the solvent flow rates are low.

While it will be understood that the apparatus of the present invention can be used in other absorption processes, it is described herein with particular reference to absorption of water from natural gas by the use of glycols. These compounds effectively absorb water without significant absorption of hydrocarbon constituents of the natural gas. The term "glycol," used herein for convenience, refers to the class of alcohols containing two hydroxyl groups, and includes the alkylene glycols such as ethylene glycol, the symmetrical polyalkylene glycols such as di- and tri-alkylene glycols, and the asymmetrical polyalkylene glycols such as ethylene propylene glycol. For the removal of water from natural gas, the use of ethylene glycol, diethylene glycol or triethylene glycol is generally preferred.

In a typical absorption process for removing water from a natural gas stream, glycol is added to the gas stream in an absorber adapted to provide intimate contact between the gas and the glycol. Absorption of water with glycols is most effectively practiced at a temperature less than 100° F. The water-rich glycol is separated from the dehydrated natural gas stream and is then heated, preferably to a temperature between 250° F. to 400° F., to boil out the water. The glycol is thereby regenerated so that it can be recycled to absorb water from untreated natural gas. Since removal of absorbed water from the glycol occurs at a regeneration temperature greater than 250° F., whereas absorption of water from the gas stream by the glycol is most effectively practiced at temperatures of 100° F. or less, it is necessary to cool the regenerated glycol before its reuse as an absorbent. In addition, heat economy makes it desirable to utilize the heat of the regenerated glycol to preheat the rich glycol.

In the past, the practice has been to pass hot regenerated glycol into a tank in which it flows in indirect heat transfer relationship with rich glycol circulating through coils immersed in the tank. In such apparatus, even under conditions ideal for heat exchange between the two fluids, the exit temperatures of the two liquids are about halfway between the entering temperatures of the two liquids, where the mass quantities are approximately equal. Thus, if lean glycol is introduced into a bath of this type at a temperature of about 300° F. and rich glycol enters the coils at a temperature of about 100° F., the exit temperatures of the two liquids from the bath and the coils, respectively, approach 200° F. This low heat transfer results both from the relatively high viscosities of the liquids and the low flow rates commonly used in water absorption processes. The low rates of heat transfer under conditions of viscous flow have in the past necessitated large heat transfer areas to produce required exit temperatures.

The apparatus of the present invention provides a structure in which improved heat transfer is obtained through more effective utilization of heat transfer area. The present invention is a heat transfer apparatus including a vertically-oriented coil formed from a tubular element. Means are provided for circulating a fluid at a first temperature interiorly of the coil. A reservoir includes an upwardly extending surface for containing a liquid at a second temperature and a peripheral portion which substantially conforms to the circumference of the coil. The peripheral portion is disposed adjacent to and above the upper end of the coil. Means are provided for adding liquid to the reservoir so as to cause a portion of the liquid to flow over the upwardly extending surface. This surface is associated with relation to the peripheral portion of the reservoir so that liquid flowing over the surface is guided to the peripheral portion. Means are provided between the peripheral portion of the reservoir and the upper end of the coil to guide liquid flowing off such portion to the center of the tubular element of the coil.

The heat transfer apparatus of the present invention provides a structure which produces "curtain" or sheet flow of liquid over the coil. As compared to a heat transfer apparatus in which a coil is immersed in a bath of liquid, greatly improved heat transfer is obtained. In a presently preferred embodiment of the invention, the surface of the reservoir for containing the liquid is provided with a plurality of circumferentially spaced-apart V-notch weirs. Liquid passing through the weirs flows down the surface to the peripheral portion of the reservoir from which it passes onto the coil and flows downwardly over the coil as a sheet or film of liquid.

The heat transfer apparatus of the present invention is particularly useful in an apparatus for regenerating a contaminated solvent, particularly a viscous solvent such as a glycol. Use of the apparatus of the present invention in regeneration of glycols results in an approach of 10° to 20° F. between the inlet temperature of rich glycol and the exit temperature of lean glycol. The improved heat transfer results from the structure which uniformly distributes the lean glycol over the coil as a film of liquid.

The apparatus of the present invention as well as its manner of use will be better understood from the following description taken in conjunction with the accompanying drawings in which:

FIGURE 1 is a side elevational view, partially broken away, showing a solvent regeneration apparatus incorporating the heat transfer apparatus of the present invention;

FIGURE 2 is an enlarged fragmentary view showing the heat transfer apparatus in greater detail; and FIGURE 3 is a fragmentary view generally taken along line 3—3 of FIGURE 2.

With reference to FIGURE 1, a solvent regenerator 10 is formed from a vertical cylindrical shell 11 closed at its upper end by a top pressure-tight cover 12, and at its lower end by a bottom pressure-tight cover 13. A reduced diameter pedestal 14 extends between a horizontal supporting base 15 and bottom cover 13. A transverse internal diaphragm 16 is peripherally welded to shell 11 intermediate its upper and lower ends so as to divide the regenerator into a boiler portion 18 constituting the upper portion of the regenerator and a heat transfer section 19 constituting the lower portion of the regenerator.

A stripper unit 20 extends upwardly from the upper end of the regenerator and includes a vertical tube 21 having atmospheric cooling fins 22 radially extending from the upper portion of its length. The upper end of tube 21 is closed by a cap 23 incorporating a vapor vent 24 in the form of an open-ended tube. A rich solvent inlet duct 25 into tube 21 is provided below the fins 22. The lower end of tube 21 terminates at a flange 26 which is engageable with a mating flange 27 joined to the upper end of a stripper support pipe 28 which extends within shell 11 to provide flow communication with the boiler portion of the regenerator. Reinforcing brackets 29 are welded to stripper support pipe 28 between support flange 27 and the exterior of top cover 12 of the regenerator.

A hot well 30 having an open upper end extending exteriorly of the regenerator is fitted through the top cover and extends downwardly into the boiler portion. The hot well is formed by a cylindrical body 31 having a bottom closure 32. A heat source (not shown) is provided in the hot well 30 and may be an oil fired burner, steam coils in an oil bath, or electrical resistance units. The hot well is partially immersed in a pool of rich glycol 35 maintained in the boiler portion at a liquid level 36. A downcomer or lean glycol circulation tube 38, having its upper end at the level of the glycol in the boiler portion, extends through and below diaphragm 16 into heat transfer section 19 of the regenerator. This configuration provides a self-regulating means by which a constant volume of glycol is maintained in the boiler portion and any glycol in excess of that volume is transferred to the heat transfer section. A drain pipe 39 adjacent the lower end of the boiler portion and having its inner end above diaphragm 16 enables draining of the boiler portion in the event repairs therein are necessary. The drain tube 39 also provides a means for changing the solvent in the system when a material other than water is desired to be removed from a gaseous stream.

A vertically-oriented helical coil 40 formed from a tubular element is centrally positioned in the heat transfer section of the regenerator. An inlet connection 41 located exteriorly of shell 11 provides a flow connection to the lower end of coil 40, and an outlet connection 42, also located exteriorly of shell 11, provides a flow connection to the upper end of coil 40. As schematically indicated by broken line 43, outlet connection 42 is coupled by a suitable conduit so as to be in flow communication with inlet duct 25 in the stripper unit. A glycol flow distributor 45, to be later described in greater detail, is located above coil 40 in the upper end of the heat transfer section 19 so as to be below lower end 46 of downcomer 38 and concentric with the coil. The flow distributor is supported by vertical supports (not shown) extending interiorly of coil 40 to the bottom cover of the regenerator. A lean glycol outlet duct 48 passing through the bottom cover into the heat transfer section of the regenerator extends exteriorly of the regenerator and is connected by suitable conduit with a water absorption apparatus indicated generally at 49. A pump 65 is installed between outlet 48 and inlet 41 for circulating rich solvent through coil 40.

With particular reference to FIGURES 2 and 3, flow distributor 45 includes a reservoir or pan 50 horizontally disposed above coil 40 and below lower end 46 of downcomer 38. While the pan of the embodiment herein described is circular in area, other configurations, as, for example, an annular pan having an inner diameter corresponding to the outer diameter of the coil and supported on shell 11 of the regenerator, can be used. Pan 50 is formed by a circular pan bottom 50A to which an inclined side 51 is circumferentially joined intermediate an upper edge 52 and a lower edge 53 of the side. The inclination of the side is such that upper edge 52 is inward of the circumference of pan bottom 50A, and lower edge 53 is outward of the circumference of the pan bottom. The circumference defined by lower edge 53 substantially conforms to the circumference of the center of the tubular element of coil 40. A plurality of V-notch weirs 54 are circumferentially spaced apart in upper edge 52 of side 51. In a presently preferred embodiment of the invention, weirs 54 are spaced on one-inch centers.

A portion of the glycol contained by the pan flows through the weirs and downwardly and outwardly along the side to lower edge 53. The inward inclination of the portion of the side above the pan bottom provides a trap for retaining sludge, scale, and dirt, generally indicated at 56, that may be present in the glycol contained by the pan.

An upwardly and outwardly extending ring of screen or wire mesh 59 is circumferentially secured to the top center portion 60 of the uppermost portion of the tubular element forming coil 40 and extends to an upper edge 61 above lower edge 53 of side 51. The inclination of screen 59 is such that it is substantially perpendicular to side 51 of the pan. The glycol flowing off lower edge 53, as previously described, is guided by screen 59 to the center of the tubular element of the coil. Preferably, edge 53 is disposed about one-half inch above the center of the tubular element. The openings in screen 59 are such that no plugging will occur by build-up of sludge, scale, and other foreign particles.

In water absorption systems such as described herein, the glycol rates of flow are low, often being of the order of one gallon per minute or less. Flow distributor 45, in cooperation with screen 59, produces a film flow of glycol over coil 40 so as to improve materially heat transfer at low flow rates.

In operation of the solvent regeneration apparatus heretofore described, lean glycol is enriched by absorbing water from a gaseous stream in absorber 49. The relatively cold rich glycol is introduced into the lower part of coil 40 through inlet connection 41 and is circulated upwardly through the coil in indirect heat transfer relationship with relatively hot lean glycol flowing downwardly over the exterior of the coil. The preheated rich glycol leaves the coil through outlet connection 42 and is fed into stripper unit 20 through inlet duct 25 to flow downwardly through tube 21 and support pipe 28 into the boiler portion. The downwardly flowing rich glycol contacts water and glycol vapors rising from the boiler portion. The rich glycol, while preheated, is sufficiently cool to condense the major portion of glycol vapor in the column but does not condense the water vapor which continues to rise and passes out through vapor vent 24. Any glycol vapor which passes above inlet duct 25 is condensed by air cooling in the upper portion of tube 21. Upon being added to the pool of glycol in the boiler portion, the rich preheated glycol is further heated to a temperature at which the absorbed water in the glycol is boiled off. From the boiler portion, hot lean glycol is continuously displaced through downcomer 38 into pan 50. The lean glycol flows through weirs 54 and is distributed as a film or sheet over the coils 40 containing the upwardly circulating rich glycol. The resulting heat transfer cools the lean glycol and preheats the rich glycol. The cooled lean glycol flowing off coil 40 is collected in the bottom of the heat transfer section and is drawn off through outlet duct 48 for recirculation to absorber 49.

Through the apparatus of the present invention, rich glycol can enter duct 41 at a temperature of about 100° F. and leave the apparatus through outlet duct 48 as lean glycol at a temperature in the range from 110° to 120° F. The low temperature of the lean glycol leaving outlet duct 48 substantially reduces the amount of refrigeration necessary for cooling lean glycol prior to introduction into the water absorption apparatus. Likewise, because of the high temperature of the preheated glycol entering the boiler portion, the heat input required from the heating apparatus in hot well 30 is substantially reduced.

While this invention has been described above in conjunction with specific apparatus and in conjunction with specific solvents, it is to be understood that this has been by way of explanation only and is not to be considered as limiting the scope of this invention.

I claim:
1. In an apparatus for regenerating a contaminated solvent,
   (a) a boiler for heating the contaminated solvent to a temperature above the boiling point of the contaminant to regenerate the solvent by separating the contaminant from the solvent,
   (b) a multi-turn vertically-oriented helical coil of cylindrical configuration formed from a tubular element to define inner and outer cylindrical coil surfaces and having the adjacent turns thereof contiguous to each other,
   (c) means for circulating contaminated solvent through the coil and from the coil to the boiler,
   (d) a reservoir for containing regenerated solvent disposed above and concentric to the coil, the reservoir including
      (i) a bottom having a circumferential peripheral edge
      (ii) a side wall sealed to the peripheral edge of the reservoir bottom about the extent of the peripheral edge and extending from a lower edge thereof upwardly and inwardly of the reservoir from said peripheral edge, the side wall having a lower edge disposed over and above the upper end of the coil around the circumference of the coil,
      (iii) a plurality of V-notches formed through the reservoir side wall at spaced-apart locations around the upper edge thereof and extending from said upper edge only partially toward the bottom of the reservoir,
   (e) means for transferring regenerated solvent from the boiler to the reservoir, the amount of the regenerated solvent transferred to the reservoir which exceeds the capacity of the reservoir flowing out of the reservoir through the V-notches and downwardly over the reservoir side wall to the top of the coil, solid impurities in the regenerated solvent transferred to the reservoir accumulating in the reservoir over the bottom thereof and being prevented from flowing over the coil by said upwardly and inwardly extending side wall sealed to the peripheral edge of the reservoir bottom,
   (f) means joined to the upper turn of the coil centrally of the inner and outer cylindrical surfaces of the coil for receiving regenerated solvent from the lower edge of the reservoir side wall and for directing the received solvent to the upper turn of the coil substantially centrally of the coil cylindrical surfaces so that the solvent flows as a film downwardly over the coil cylindrical surfaces, and
   (g) means disposed below the coil for collecting regenerated solvent after flow thereof over the cylindrical surfaces of the coil.

2. In an apparatus for regenerating a contaminated solvent,
   (a) a boiler for heating the contaminated solvent to a temperature above the boiling point of the contaminant to regenerate the solvent by separating the contaminant from the solvent,
   (b) a multi-turn vertically-oriented helical coil of cylindrical configuration formed from a tubular element to define inner and outer cylindrical coil surfaces and having the adjacent turns thereof contiguous to each other, the coil having an inlet at the lower end thereof and an outlet at the upper end thereof,
   (c) means for circulating contaminated solvent through the coil and from the coil to the boiler,
   (d) a reservoir for containing regenerated solvent disposed centrally above and concentric to the coil, the reservoir including
      (i) a substantially horizontal bottom having a circumferential peripheral edge spaced about its extent uniformly inwardly of the upper end of the coil,
      (ii) a side wall sealed to the peripheral edge of the reservoir bottom about the extent of the peripheral edge and extending upwardly and inwardly of said peripheral edge to an upper edge spaced above the bottom and disposed inwardly of the reservoir from the bottom peripheral edge, the side wall also extending downwardly away from the bottom peripheral edge to a lower edge disposed over and above the upper end of the coil around the circumference of the coil,
      (iii) a plurality of substantially identical V-notches formed through the reservoir side wall at spaced-apart locations around the upper edge thereof and extending from said upper edge only partially toward the bottom of the reservoir,
   (e) means for transferring regenerated solvent from the boiler to the reservoir, the amount of the regenerated solvent transferred to the reservoir which exceeds the capacity of the reservoir flowing out of the reservoir through the V-notches and downwardly over the reservoir side wall to the top of the coil from the lower edge of the side wall, solid impurities in the regenerated solvent transferred to the reservoir accumulating in the reservoir over the bottom thereof and being prevented from flowing over the coil by said upwardly and inwardly extending side wall sealed to the peripheral edge of the reservoir bottom,
   (f) a mesh screen joined to the upper turn of the coil centrally of the inner and outer cylindrical surfaces of the coil and extending upwardly and outwardly of the coil substantially normal to the reservoir side wall for receiving regenerated solvent from the lower edge of the reservoir side wall and for directing the received solvent to the upper turn of the coil centrally of the coil cylindrical surfaces so that the solvent flows as a film downwardly over the coil cylindrical surfaces, and
   (g) means disposed below the coil for collecting regenerated solvent after flow thereof over the cylindrical surfaces of the coil.

References Cited by the Examiner
UNITED STATES PATENTS

| | | | |
|---|---|---|---|
| 1,415,667 | 5/1922 | Major | 202—177 X |
| 1,910,281 | 5/1933 | Charrier | 202—236 X |
| 2,024,639 | 12/1935 | Greene | 165—118 X |
| 2,180,052 | 11/1939 | Hickman et al. | 202—236 X |
| 2,348,601 | 5/1944 | Buschow et al. | 165—117 X |
| 2,353,551 | 7/1944 | Dexter | 202—236 X |
| 2,562,153 | 7/1951 | Taylor | 202—236 X |
| 2,747,002 | 5/1956 | Walker et al. | 62—20 |
| 2,750,331 | 6/1956 | Meyers | 202—153 X |
| 2,758,665 | 8/1956 | Francis | 62—20 X |
| 3,004,901 | 10/1961 | Nerge et al. | 202—236 |
| 3,162,515 | 12/1964 | Connors et al. | 55—32 |

ROBERT F. BURNETT, *Primary Examiner.*

NORMAN YUDKOFF, *Examiner.*